(No Model.)
C. F. W. BEGEMANN.
FILTER.
No. 357,897. Patented Feb. 15, 1887.
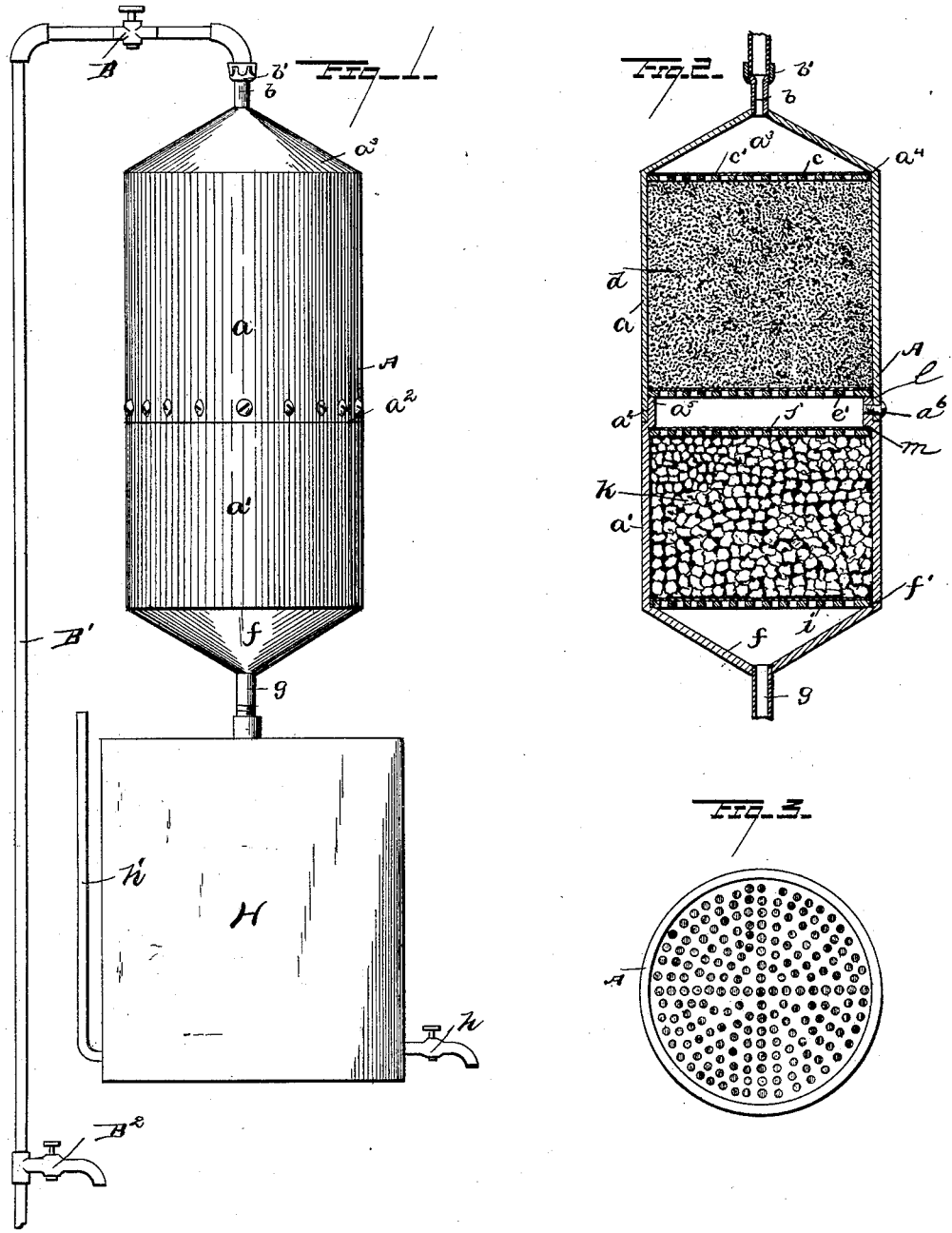

UNITED STATES PATENT OFFICE.

CHARLES FREDRICH WILLIAM BEGEMANN, OF EL PASO, TEXAS.

FILTER.

SPECIFICATION forming part of Letters Patent No. 357,897, dated February 15, 1887.

Application filed August 7, 1886. Serial No. 210,342. (No model.)

*To all whom it may concern:*

Be it known that I, CHARLES FREDRICH WILLIAM BEGEMANN, a citizen of the United States, residing at El Paso, in the county of El Paso and State of Texas, have invented a new and useful Improvement in Filters, of which the following is a specification.

My invention relates to devices for filtering impure water; and the invention consists in certain peculiar and novel features of construction and arrangement, as hereinafter described and claimed.

In order that my invention may be fully understood, I will proceed to describe it with reference to the accompanying drawings, in which—

Figure 1 is a side elevation of my improved filtering apparatus. Fig. 2 is a vertical cross-section of the same. Fig. 3 is a sectional view of filter.

In the said drawings, A designates the shell or casing of my improved filter, said casing being of galvanized iron or other non-corrodible metal. This shell or casing is formed of two sections, $a\ a'$, the upper one, $a$, of which is somewhat longer than the lower one, $a'$, and said sections are united together by a lapped joint, $a^2$, as shown, so that the external surface of the casing shall have a uniformly smooth circumference, and shoulders $l$ and $m$ shall be formed on the inner side of the casing, near the center thereof. The sections $a$ and $a'$ are secured firmly together by screws $a^6$, which extend transversely through the lapped portions of the sections. By removing these screws the sections may be readily separated. The said shell or casing is tubular or cylindrical in form, as shown. The upper end, $a^3$, of the section $a$ is of conical form, and into the apex of this conical portion is screwed a pipe, $b$, the outer end of which is provided with a coupling, $b'$, for connecting said pipe to a faucet, B, as shown. The lower end of the conical portion $a^3$ forms an annular shoulder, $a^4$, against which a screen-plate, $c$, is confined by the filtering material $d$ within said section $a$.

$c'$ designates a piece of fine muslin or other similar fabric which lies above the screen-plate, and serves to prevent the escape of the filtering material $d$, when the filter is inverted, as hereinafter described. In the lower end of section $a$ is placed a screen-plate, $e$, which is sustained by the upper jointed end, $a^5$, of the lower section, $a'$, so that the filtering material $d$ is confined between the plates $c$ and $e$, as shown.

The lower end, $f$, of section $a'$ is of conical form, similar to the upper end of section $a'$, and through the apex of this conical portion $f$ is screwed a pipe, $g$, the opposite or outer end of which enters a reservoir, H, to be hereinafter more particularly described. The upper end of the conical portion $f$ forms an annular shoulder, $f'$, against which rests a screen-plate, $i$. In the upper end of the section $a'$ is placed a screen-plate, $j$, between which and the plate $i$ is confined a second body of filtering material, $k$.

The reservoir H may be of rectangular or other suitable form, and its top has an aperture to receive the pipe $g$, as before stated. At the front of the reservoir H is placed an outlet-cock, $h$, and at the rear or upon the top of the said reservoir is placed a gage-tube, $h'$, which is open at its upper end.

Besides the faucet B the supply-pipe B' carries an ordinary faucet, $B^2$, as shown.

It will be readily seen that the filter will cleanse perfectly the most impure water, and that the filter may be readily emptied for cleaning. It is portable and convenient and reliable in use, and may be employed either with or without the reservoir H. In cleaning the filter its two sections are unscrewed, the chamber or shell having first been detached from the faucet B, and no waste of the filtering material can occur, owing to the presence of the fabric above described. The filtering material in the upper section, $a$, is preferably baked and cleaned sand, and that in the lower section is live-wood charcoal.

I attach importance to the lapped joint $a^2$, between the sections $a\ a'$ of the filter-casing. This joint is made by reducing the diameter of the upper end of section $a'$, providing an inwardly-extending circular wall, $a^5$, forming a shoulder, $l$, at the top of the wall, so that when the sections are secured together the shoulder $l$ supports the screen-plate $e'$ and the body of sand or filtering material $d$ above. At the point of intersection between the section $a'$ and the annular wall $a^5$ is provided the other shoulder, $m$. When both sections $a$ $a'$ are secured together, the screen-plate $f$, which covers the top of the body $k$ of filtering-charcoal, comes below the shoulder $m$, and retains the body in place. Special stress is laid on the advantages of the shoulders $l$ $m$, when it is desired to clean the filter or supply new filtering material. To obtain access to the interior of the filter, it is necessary to invert the sections $a$ $a'$, and if the shoulders $l$ $m$ were not employed no provision would be left for the support of the screen-plates, so that upon inverting the sections the screen-plates with the filtering material would escape. To avoid this I provide the shoulders $l$ $m$. When thus constructed, and it is desired to obtain access to the interior of the sections, the filter A is detached from the pipe B' and reservoir H, and the filter inverted with the section $a$ facing down and section $a'$ up. When in this position, the shoulder $m$, inside of section $a'$, supports the screen-plate $f$ and the body of the filtering material above.

Having inverted the sections without disarranging the parts, the filter may be cleaned in the usual manner.

I am aware that it is old to provide a filter consisting of three sections connected together by a screw-joint, and having the filtering-cloth of screen clamped between the cloth. This is not what I claim.

Having thus described this invention, what I claim as new therein, and desire to secure by Letters Patent, is—

1. A filter consisting of sections $a$ $a'$, the filter-section $a'$ having a reduced upper edge forming an annular wall, $a^5$, the top of which provides a shoulder, $l$, within section $a$, and the bottom of which forms shoulder $m$ within section $a'$, in combination with screen-plates $e'$ $f$, the plate $e'$ being supported on shoulder $l$ within section $a$, and the plate $f$ resting against shoulder $m$ within section $a'$, the lower edge of section $a$ fitting around the wall $a^5$, and secured thereto, as set forth.

2. A filter consisting of sections $a$ $a'$, secured together at their meeting edges by a lapped joint, the upper edge of section $a'$, being fitted wholly within section $a$ and forming a shoulder, $l$, for the support of a screen-plate, $e'$, and the body of filtering material above, a shoulder, $m$, on section $a'$, below shoulder $l$, and screen-plates $e'$, resting on and held to the shoulders $l$ $m$ by the weight of the body of filtering material, whereby, when the filter-sections are inverted, the shoulder $m$ serves to support screen $f$ and the filtering material above, at set forth.

In testimony that I claim the foregoing as my own I have hereto affixed my signature in presence of two witnesses.

CHARLES FREDRICH WILLIAM BEGEMANN.

Witnesses:
LEONARD ADOLF SCHLEICHER,
GEORGE SCHMIDT.